United States Patent [19]
Kihara

[11] 3,899,798
[45] Aug. 19, 1975

[54] METHOD FOR MANUFACTURING INSOLE FOR A SHOE

[75] Inventor: Sueo Kihara, Osaka, Japan

[73] Assignees: Kureha Kagaku Kogyo K.K.; Kihara Sangyo Kabushiki Kaisha, both of Tokyo, Japan

[22] Filed: May 24, 1974

[21] Appl. No.: 473,199

[30] Foreign Application Priority Data
June 8, 1973 Japan.................................. 48-65240

[52] U.S. Cl. .................................. 12/146 B; 36/44
[51] Int. Cl. ...................................................... A43d
[58] Field of Search .......... 12/146 B, 146 R, 142 A; 36/44

[56] References Cited
UNITED STATES PATENTS

| | | | |
|---|---|---|---|
| 2,403,253 | 7/1946 | White .............................. | 12/142 A |
| 2,425,388 | 8/1947 | Oestricher ........................ | 36/44 X |
| 2,559,014 | 7/1951 | Fortier.................................. | 36/44 |
| 2,622,348 | 12/1952 | Sellinger ............................... | 36/44 |
| 2,917,842 | 12/1959 | Scholl............................ | 12/146 B X |
| 3,186,013 | 6/1965 | Glassman et al. ................ | 12/146 B |
| 3,418,732 | 12/1968 | Marshack..................... | 12/146 B X |
| 3,461,575 | 8/1969 | Tead et al........................... | 36/44 X |
| 3,555,709 | 1/1971 | Raffaelli................................. | 36/44 |

Primary Examiner—Alfred R. Guest
Attorney, Agent, or Firm—Holman & Stern

[57] ABSTRACT

Insole for a shoe is formed by a simple method which is a combination of formation of a material sheet, formation of a material insole from the material sheet, formation of a longitudinal slit in the uppermost surface layer of the material insole, overturning the uppermost surface layer of the material insole via the slit and closing of the slit by application of thermal fusion embossing, thereby the process of attaching separate protective edging to the periphery of the material bare insole usually employed in the conventional arts being omitted.

5 Claims, 7 Drawing Figures

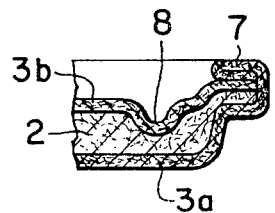
FIG. 4
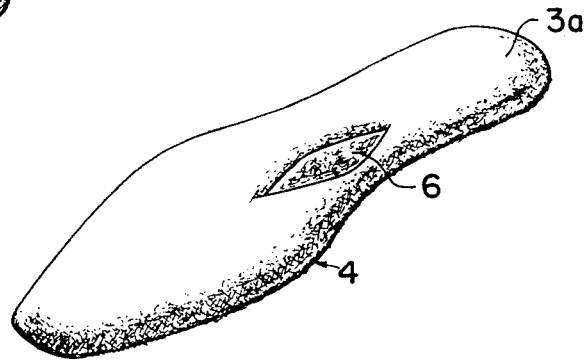
FIG. 5
FIG. 6
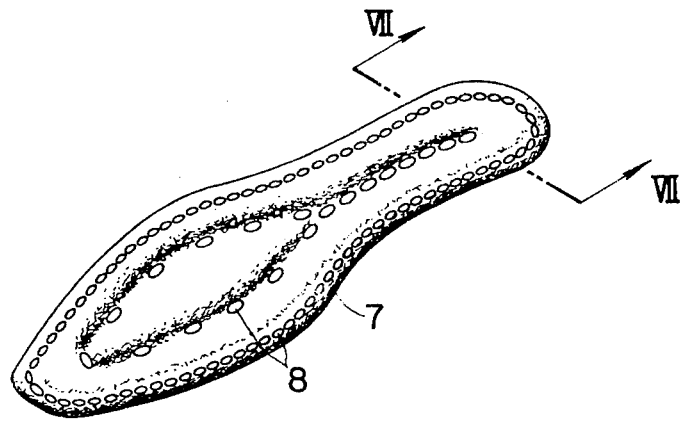
FIG. 7
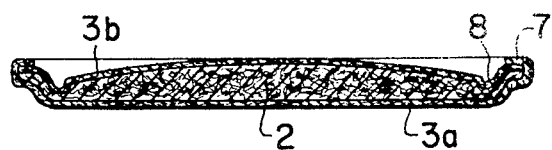

METHOD FOR MANUFACTURING INSOLE FOR A SHOE

BACKGROUND OF THE INVENTION

The present invention relates to improved method for manufacturing insole for a shoe, more particularly relates to simplified method for manufacturing insole to be placed underneath the foot in a shoe by application of thermal fusion embossing to a material insole made up of some plastic material.

In the conventional method for manufacturing insole for a shoe, a main body is prepared by superimposing an upper surface layer and a lower surface layer to each other and applying thermal fusion to the periphery of the main body in order to prevent the separation thereof. After this preparation of the main body sheet, a separate protective edging is attached to the periphery of the main body sheet because the thermally fused bare edges of the main body sheet may pain the sole of the user. In the case of insole for a shoe made by such conventional method, the insole hardly withstands a long time use and, in addition, complicated operation is necessary in order to attach the separate protective edging to the periphery of the main body sheet which forms a curve patterned after the outside shape of foot.

SUMMARY OF THE INVENTION

It is the primary object of the present invention to provide insole for a shoe which can withstand a long time use without separation of layers composing the insole.

It is another object of the present invention to provide a method for manufacturing such insole with an a protective edging in a very simplified manner.

In accordance with the basic aspect of the present invention, insole for a shoe is formed by a sequentially combined process of formation of material sheet, formation of material insole from such material sheet, formation of a longitudinal slit in the uppermost surface layer of the material insole, overturning of the uppermost surface layer of the material insole via the slit so formed, closing of the slit by application of thermal fusion embossing.

BRIEF DESCRIPTION OF THE DRAWING

Further features and advantages of the present invention will be made clearer from ensuing description, reference being made to the accompanying drawings, in which;

FIG. 4 is a partial cross-sectional view of the insole manufactured according to one aspect of the present invention, FIG. 5 is a perspective view of an insole according to one aspect of the present invention before closing of the slit, FIG. 6 is a perspective view of the insole according to another aspect of the present invention after closing of the slit, and FIG. 7 is a cross-sectional view taken along the line XII—XII in FIG. 6.

DETAILED DESCRIPTION OF THE PREFERRED EMBODIMENTS

Figure 1:
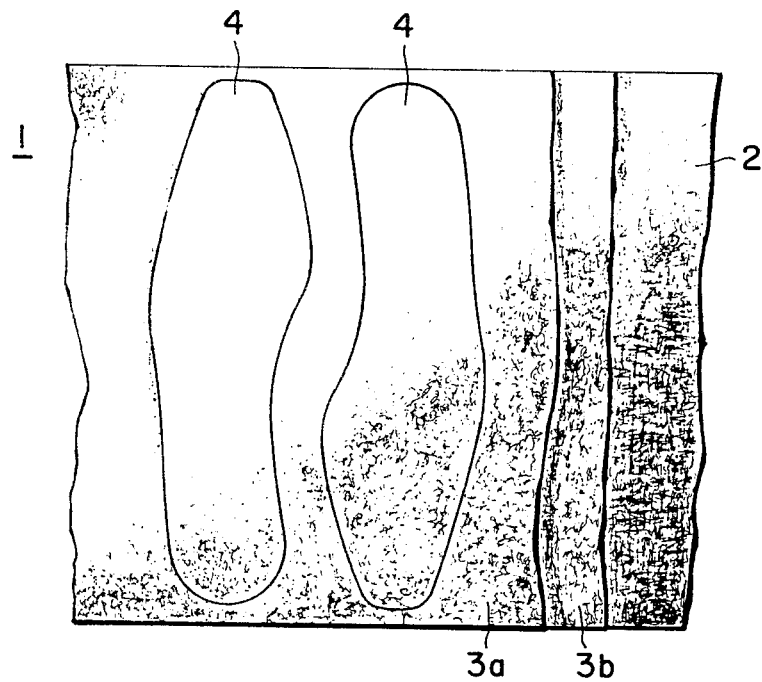
FIG. 1 is a top plan view of the material insole of the present invention.

Now, referring to FIG. 1 a material sheet 1 is made up of a base layer 2 and two sets of surface layers 3a and 3b which are superimposed on each other.

The base layer 2 is of a network or fibrous structure and made up of synthetic resinous yarns. The surface layers 3a and 3b are of an extensible nature and made up for example, of knitted or spandex fabrics.

Figure 2:
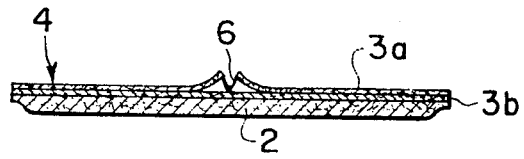
FIG. 2 is a cross-sectional view of the material insole after formation of longitudinal slit.

From the material sheet 1 so prepared are material insoles 4 cut out by application of thermal fusion to conform to the standard foot shape. Next, as shown in FIGS. 2 and 3, a slit 6 is formed in the upper surface layer 3a in a substantially longitudinal direction of the material insole 4 over a prescribed length.

Figure 3:
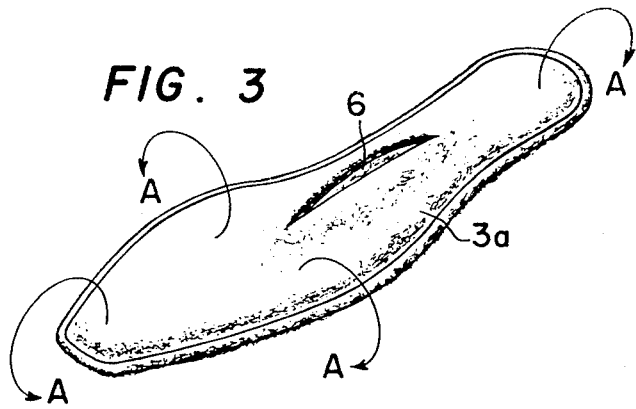
FIG. 3 is a perspective view of the material insole after formation of the slit.

After this formation of the slit 6, the upper side surface layer 3a of the material insole 4 is overturned using the slit 6 so formed as shown with arrows A in FIG. 3. By this overturning of the upper surface layer 3a a protective edging 7 is automatically formed along the periphery of the material insole 4 as shown in FIG. 4.

Subsequent to overturning of the upper surface layer 3a the longitudinal slit 6 still remains in the surface of the material insole 4 and such slit 6 is closed by making a decorative pattern 8 by application of thermal fusion embossing as shown in FIG. 6.

Owing to the thermal fusion effect given to the material insole at the time of the preparation of the material insole 4 and at the time of the formation of the decorative pattern 8, three layers composing the material insole 4, i.e., the base layer 2 and the surface layers 3a and 3b are united quite stably to each other.

By the sequential operations of the preparation of the material sheet, the preparation of the material insole, the formation of the slit, the overturning of the upper surface layer and the closing of the slit, the insole to be placed underneath the foot in a shoe such as shown in FIG. 7 is obtained in accordance with one aspect of the present invention.

Because the protective edging 7 is formed quite automatically in the method of the present invention on the periphery of the insole during the manufacturing process of this insole, it is not necessary in accordance with the present invention to attach separate edging cloth to the main body of the insole which was a usual practice in the prior art.

What is claimed is:

1. Method for manufacturing insole for a shoe comprising in sequential combination: formation of a material sheet from a base layer and one or more sets of surface layers of extensible nature by superimposing said layers on each other; formation of material insole by application of thermal fusion cutting to said material sheet, said material insole being patterned after a given standard foot style; formation of a slit in the uppermost surface layer of said material insole; overturning of said uppermost surface layer utilizing said slit formed in said uppermost surface layer; closing of said slit by application of thermal fusion embossing; and formation of a decorative pattern on said uppermost surface layer of said material insole by application of thermal fusion embossing.

2. Method for manufacturing insole for a shoe according to claim 1 in which said base layer is made up of synthetic resinous yarns.

3. Method for manufacturing insole for a shoe according to claim 1 in which said base layer is provided with a network structure.

4. Method for manufacturing insole for a shoe according to claim 1 in which said one or more sets of surface layers are made up of spandex fabrics.

5. Method for manufacturing insole for a shoe according to claim 1 in which said one or more sets of surface layers of said material insole are made up of knitted fabrics.

* * * * *